United States Patent
Pernull et al.

(10) Patent No.: US 10,411,883 B2
(45) Date of Patent: Sep. 10, 2019

(54) DEVICES AND METHODS FOR MULTI-CHANNEL SAMPLING

(71) Applicant: Infineon Technologies AG, Neubiberg (DE)

(72) Inventors: Martin Pernull, Villach (AT); Andreas Kalt, Treffen (AT); Gerhard Pichler, Ferndorf (AT); Franz Wachter, A-Sattendorf (AT); Bernhard Wotruba, Munich (DE)

(73) Assignee: Infineon Technologies AG, Neubiberg (DE)

( * ) Notice: Subject to any disclaimer, the term of this patent is extended or adjusted under 35 U.S.C. 154(b) by 126 days.

(21) Appl. No.: 15/296,940

(22) Filed: Oct. 18, 2016

(65) Prior Publication Data
US 2017/0118012 A1    Apr. 27, 2017

(30) Foreign Application Priority Data

Oct. 26, 2015    (DE) .................. 10 2015 118 247
Oct. 17, 2016    (DE) .................. 10 2016 119 750

(51) Int. Cl.
*G06F 21/00*    (2013.01)
*H04L 9/06*    (2006.01)

(52) U.S. Cl.
CPC ........ *H04L 9/0662* (2013.01); *H04L 2209/08* (2013.01)

(58) Field of Classification Search
CPC .................................................. H04L 9/0662
See application file for complete search history.

(56) References Cited

U.S. PATENT DOCUMENTS

| | | | | |
|---|---|---|---|---|
| 4,726,019 A * | 2/1988 | Adelmann | .............. | H04L 12/64 370/474 |
| 5,999,561 A * | 12/1999 | Naden | .................... | H04B 1/707 375/142 |
| 6,069,915 A * | 5/2000 | Hulbert | ................ | H04B 1/7075 370/517 |
| 6,188,294 B1 * | 2/2001 | Ryan | ...................... | H03B 29/00 327/164 |
| 6,324,558 B1 * | 11/2001 | Wilber | ...................... | G06F 7/58 708/250 |
| 6,792,542 B1 * | 9/2004 | Lee | ........................ | G10L 19/018 375/E1.002 |
| 7,015,853 B1 * | 3/2006 | Wolff | .................. | H03M 1/0641 341/155 |
| 7,046,183 B2 * | 5/2006 | Bilinskis | ............... | H03M 1/128 341/143 |
| 7,136,593 B1 * | 11/2006 | Yano | ........................ | H04J 14/02 398/158 |

(Continued)

FOREIGN PATENT DOCUMENTS

WO    2017005748 A1    1/2017

OTHER PUBLICATIONS

Bilinskis, "Digital Alias-free Signal Processing," Mar. 6, 2007, 429 pp. [uploaded in 10 parts].

*Primary Examiner* — David Garcia Cervetti
(74) *Attorney, Agent, or Firm* — Shumaker & Sieffert, P.A.

(57) ABSTRACT

Devices for sampling a plurality of input signals are provided, wherein a sampling device is controlled to sample the input signals in a random order with additional delays. Other embodiments relate to voltage monitoring systems and corresponding methods.

20 Claims, 8 Drawing Sheets

(56) References Cited

U.S. PATENT DOCUMENTS

| | | | | |
|---|---|---|---|---|
| 7,424,275 B2* | 9/2008 | Somayajula | H03M 1/0658 | 341/122 |
| 7,949,883 B2* | 5/2011 | Shu | G06F 9/3001 | 713/190 |
| 8,149,956 B1* | 4/2012 | Su | H04L 27/2337 | 375/324 |
| 8,396,119 B1* | 3/2013 | Linzer | H04N 19/50 | 375/240.02 |
| 8,418,203 B1* | 4/2013 | Nishio | H04N 21/8543 | 725/32 |
| 9,000,809 B2 | 4/2015 | Bogner et al. | | |
| 9,391,607 B2* | 7/2016 | Joharapurkar | G06F 3/0418 | |
| 9,450,597 B1* | 9/2016 | Ahmed | H03M 1/1245 | |
| 9,710,231 B2* | 7/2017 | Youn | G06F 7/588 | |
| 2001/0014944 A1* | 8/2001 | Ibi | G06F 21/83 | 713/183 |
| 2002/0029345 A1* | 3/2002 | Kawasaki | G06F 12/1408 | 713/190 |
| 2002/0048332 A1* | 4/2002 | Ouvry | H04B 1/7113 | 375/343 |
| 2002/0069387 A1* | 6/2002 | Hapke | G01R 31/31813 | 714/733 |
| 2003/0006849 A1* | 1/2003 | Janssen | G06F 7/588 | 331/78 |
| 2003/0018608 A1* | 1/2003 | Rice | G06F 21/14 | |
| 2003/0069717 A1* | 4/2003 | Havelock | H01Q 3/24 | 702/191 |
| 2003/0080887 A1* | 5/2003 | Havelock | G10K 11/346 | 341/143 |
| 2003/0081780 A1* | 5/2003 | Kim | G11B 20/00086 | 380/252 |
| 2003/0093455 A1* | 5/2003 | Messina | H03B 29/00 | 708/801 |
| 2003/0095547 A1* | 5/2003 | Schofield | G06F 7/762 | 370/386 |
| 2003/0151713 A1* | 8/2003 | Aoki | G09G 3/3688 | 349/149 |
| 2004/0174274 A1* | 9/2004 | Seabury | G08G 1/042 | 340/941 |
| 2005/0044083 A1* | 2/2005 | Sako | G11B 20/00086 | |
| 2005/0120232 A1* | 6/2005 | Hori | G06F 21/10 | 713/193 |
| 2005/0125471 A1* | 6/2005 | Sturm | G06F 7/588 | 708/250 |
| 2005/0249109 A1* | 11/2005 | Cleveland | H04L 27/2647 | 370/203 |
| 2005/0250460 A1* | 11/2005 | Cleveland | H04L 27/2647 | 455/134 |
| 2005/0265274 A1* | 12/2005 | Cleveland | H04L 27/2647 | 370/320 |
| 2006/0069706 A1* | 3/2006 | Lazich | G06F 7/588 | 708/251 |
| 2007/0025482 A1* | 2/2007 | Wells | G10L 21/04 | 375/355 |
| 2007/0043798 A1* | 2/2007 | Boerstler | G06F 7/588 | 708/251 |
| 2007/0291833 A1* | 12/2007 | Shimanskiy | H03F 3/217 | 375/238 |
| 2008/0094054 A1* | 4/2008 | Takeyama | B60L 3/0053 | 324/105 |
| 2008/0136697 A1* | 6/2008 | Cho | G06F 7/588 | 341/155 |
| 2008/0172585 A1* | 7/2008 | Hurley | G01R 31/318385 | 714/718 |
| 2008/0215862 A1* | 9/2008 | Haga | G06F 21/14 | 712/227 |
| 2008/0232343 A1* | 9/2008 | Nguyen | H04L 27/2657 | 370/347 |
| 2009/0012782 A1* | 1/2009 | Geiser | G10L 19/12 | 704/223 |
| 2009/0016523 A1* | 1/2009 | Dupaquis | G06F 7/725 | 380/28 |
| 2009/0041229 A1* | 2/2009 | Douguet | G06F 7/725 | 380/28 |
| 2009/0089347 A1* | 4/2009 | Pomet | G06F 7/588 | 708/250 |
| 2009/0106339 A1* | 4/2009 | Vasyltsov | G06F 7/588 | 708/251 |
| 2009/0157782 A1* | 6/2009 | Lin | G06F 7/588 | 708/251 |
| 2009/0180524 A1* | 7/2009 | Wang | H04B 1/7085 | 375/149 |
| 2009/0184722 A1* | 7/2009 | Gunyan | G01R 27/32 | 324/638 |
| 2010/0060493 A1* | 3/2010 | Chen | G09G 3/20 | 341/58 |
| 2010/0201419 A1* | 8/2010 | Vasyltsov | G06F 7/588 | 327/164 |
| 2010/0211624 A1* | 8/2010 | Dichtl | G06F 7/588 | 708/251 |
| 2010/0309957 A1* | 12/2010 | Chester | H04J 13/0018 | 375/146 |
| 2010/0316090 A1* | 12/2010 | Chester | H04B 1/707 | 375/141 |
| 2011/0066580 A1* | 3/2011 | Tsai | G06N 3/08 | 706/25 |
| 2011/0075840 A1* | 3/2011 | Zayas | G06F 7/588 | 380/46 |
| 2011/0099005 A1* | 4/2011 | Zhang | G10L 19/04 | 704/207 |
| 2011/0131264 A1* | 6/2011 | Hars | G06F 7/588 | 708/254 |
| 2011/0134906 A1* | 6/2011 | Garudadri | G01D 21/00 | 370/350 |
| 2011/0261008 A1* | 10/2011 | Joharapurkar | G06F 3/0418 | 345/174 |
| 2011/0302232 A1* | 12/2011 | Vasyltsov | G06F 7/588 | 708/251 |
| 2012/0026901 A1* | 2/2012 | Gao | G01S 19/30 | 370/252 |
| 2012/0045053 A1* | 2/2012 | Qi | G06F 7/588 | 380/252 |
| 2012/0075134 A1* | 3/2012 | Rogers | H03M 1/128 | 341/155 |
| 2013/0013657 A1* | 1/2013 | Emelko | G06F 7/588 | 708/251 |
| 2013/0111204 A1* | 5/2013 | Gunnam | G06F 21/755 | 713/150 |
| 2014/0059100 A1* | 2/2014 | Liberty | G06F 7/58 | 708/250 |
| 2014/0091955 A1* | 4/2014 | Cowley | H03M 1/1028 | 341/118 |
| 2014/0114191 A1* | 4/2014 | Sankar | A61B 8/14 | 600/447 |
| 2014/0143883 A1* | 5/2014 | Shen-Orr | H04L 9/003 | 726/26 |
| 2014/0152478 A1* | 6/2014 | Lewis | H03M 1/0673 | 341/123 |
| 2014/0203854 A1* | 7/2014 | Jung | H03L 7/0802 | 327/158 |
| 2015/0115816 A1* | 4/2015 | Bradford | H05B 33/0827 | 315/192 |
| 2016/0147505 A1* | 5/2016 | Lee | G06F 7/582 | 327/164 |
| 2016/0202953 A1* | 7/2016 | Chen | G11C 11/417 | 708/250 |
| 2016/0291935 A1* | 10/2016 | Straeussnigg | G06F 7/582 | |
| 2016/0352509 A1* | 12/2016 | Wu | G09C 1/00 | |
| 2017/0118012 A1* | 4/2017 | Pernull | H04L 9/0662 | |
| 2017/0262259 A1* | 9/2017 | Reulet | G06N 10/00 | |
| 2017/0317963 A1* | 11/2017 | Gupta | H04L 51/32 | |
| 2018/0114003 A1* | 4/2018 | Uenishi | G06F 21/31 | |
| 2018/0121369 A1* | 5/2018 | Poeppelmann | G06F 11/1048 | |

* cited by examiner

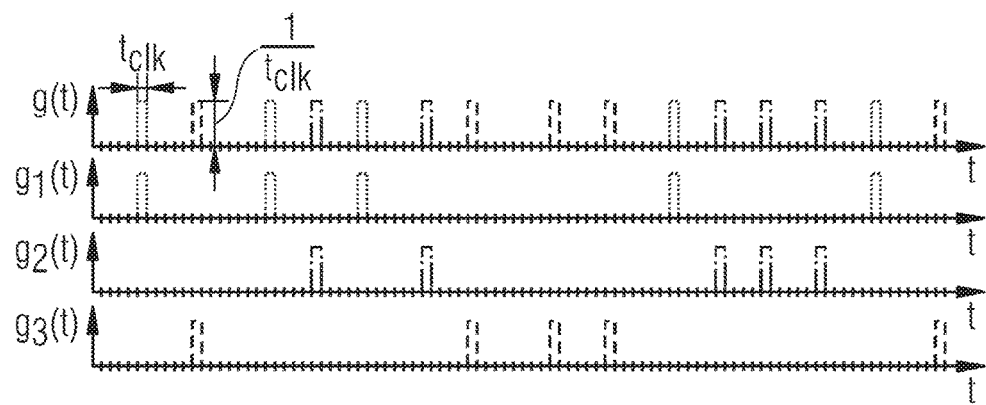
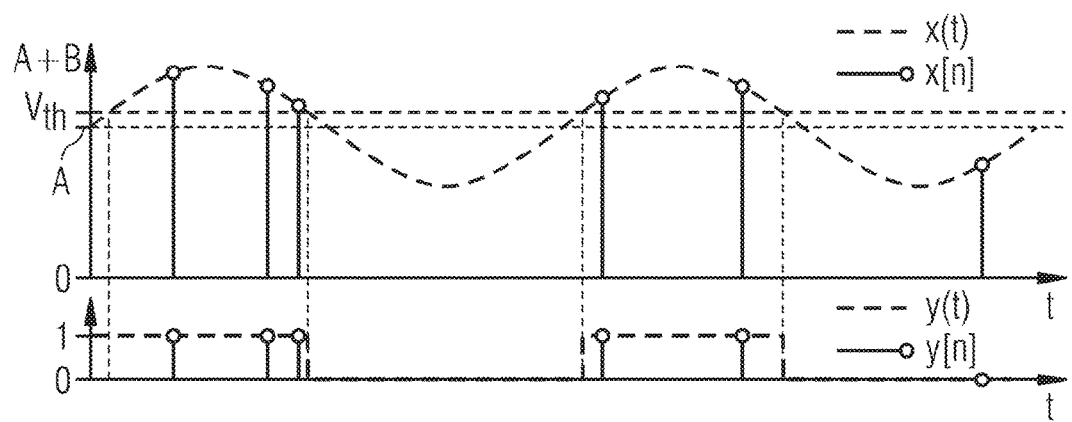

DEVICES AND METHODS FOR MULTI-CHANNEL SAMPLING

TECHNICAL FIELD

The present application relates to devices and methods for multi-channel sampling, i.e. for sampling signals on a plurality of channels or inputs.

BACKGROUND

In some applications, a plurality of signals have to be sampled. Sampling in this respect relates to generating output values in regular or irregular intervals based on an input signal. For example, an analog signal may be digitized by an analog-to-digital converter (ADC) to output digital values (also referred to as samples) at a sampling rate. Also, instead of using an ADC an input signal may be compared to a threshold using a comparator, which results in one of two values (one indicating that the signal value exceeds the threshold and the other indicating that the signal value is below the threshold), thus essentially corresponding to a one-bit ADC.

One application where such a multi-channel sampling may be implemented is a monitoring of a plurality of different supply voltages in a device, e.g. a semiconductor device. For such a monitoring, each of the voltages may e.g. be compared to one or more respective thresholds, and when the respective voltage falls below a respective threshold, this may indicate an undervoltage, or, when the respective voltage is above a respective other threshold, this may indicate an overvoltage, where correct operation of the device may not be guaranteed. For example, such monitoring may be of particular importance in safety critical applications, e.g. automotive applications.

A conventional approach to monitoring a plurality of supply voltages is to provide one or more respective comparators for each of the supply voltages, each comparator having a respective threshold voltage. To test the device in a production test, a slow high-resolution linear ramp on the respective voltage rails for the supply voltages is used to determine a switching threshold hysteresis for each of the comparators. In some situations such comparators may not be accessible from outside the device, which requires additional effort as a unique special path for testing purposes may have to be provided.

Providing a plurality of comparators requires a comparatively large amount of circuit area which increases with the number of comparators required. Furthermore, in safety critical functions a second comparator may have to be added for redundancy for each supply voltage, leading to additional area requirements. Also, if testing circuitry is required, this may add to the total area.

One straightforward way to remedy this would be to multiplex all the channels into a single comparator, and also to multiplex corresponding thresholds to the comparator e.g. in a round robin fashion. However, this leads to a plurality of uniformly sampled voltages (voltages serving as an example for input signals). As in any uniformly sampled system the sampling theorem requires that the input signals must be bandlimited to half of the applicable sampling frequency (i.e. to the Nyquist frequency) to prevent aliasing, where essentially higher frequency components are "mirrored" to a baseband.

To prevent aliasing, anti-aliasing filters could be provided for each of the input signals (channels). However, providing such anti-aliasing filters increases the required chip area again. In particular, in case of high-voltage signals in the range of many tens of volts, the anti-aliasing filter needs to be implemented using corresponding high-voltage components. Also, in case an analog-to digital converter is used as a sampling device, the anti-aliasing filter would need to be an active filter so as not to increase the settling or sampling time of the analog-to-digital converter. Such active filters in many cases would not be smaller than a comparator itself, and therefore the total chip area required may even increase.

Instead of comparators as sampling devices also analog-to-digital converters may be used. In some cases, a plurality of comparators having different thresholds could be replaced by a single analog-to-digital converter, e.g. a SAR (Successive Approximation Register) analog-to-digital converter.

Therefore, it is an objective to provide devices and methods allowing multi-channel sampling, i.e. sampling of a plurality of input signals like input voltages, while requiring less chip area than some conventional solutions.

SUMMARY

A device as defined in claim 1 is provided. Furthermore, a voltage monitoring system as defined in claim 16 is provided. Also, a method as defined in claim 19 is provided. The dependent claims define further embodiments.

According to an embodiment, a device for sampling input signals is provided, comprising:

a plurality of input channels configured to receive a plurality of input signals, a sampling device configured to selectively sample an input signal on one of the plurality of input channels, and a sampling controller, the sampling controller configured to control the sampling device such that the sampling device sequentially samples input signals from the plurality of channels with a random channel order and additional delays to provide non-uniform sampling periods between individual samplings.

According to another embodiment, a voltage monitoring system is provided, comprising:

a device as defined above, wherein the plurality of input channels are associated with a plurality of voltages to be monitored.

According to a further embodiment, a method is provided, comprising:

providing input signals on a plurality of channels, sequentially sampling the input signals with random channel order and additional delays between samplings to provide non-uniform sampling periods, and outputting the sampled input signals.

BRIEF DESCRIPTION OF THE DRAWINGS

FIGS. 7 to 10 are explanatory diagrams to explain various multi-channel sampling approaches.

FIG. 11 illustrates an example for an occurrence of a wrong output state.

DETAILED DESCRIPTION

Figure 1:
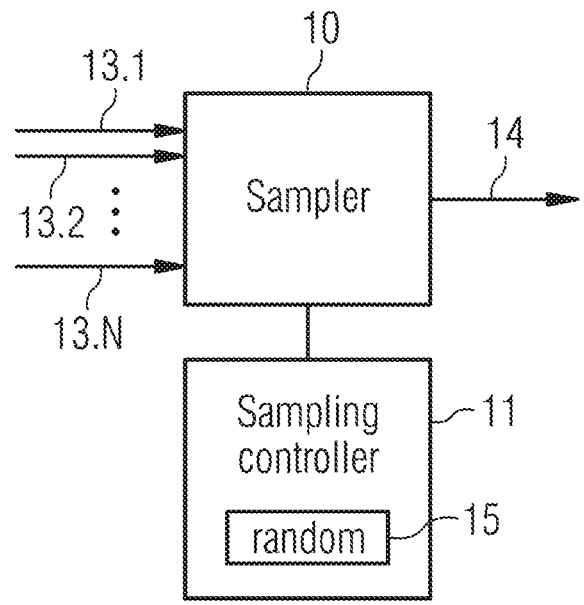
FIG. 1 is a schematic block diagram of a device according to an embodiment.

In the following, various embodiments will be described referring to the attached drawings. These embodiments serve illustrative purposes only and are not to be construed as limiting. For example, a description or representation of an embodiment comprising a plurality of features or elements does not indicate that all these features or elements are necessary for implementing embodiments. Instead, in other embodiments, some of the described features or elements may be omitted, and/or may be replaced by alternative features or elements. Furthermore, additional features or elements apart from the ones explicitly described or shown may be present, e.g. features or elements conventionally used in sampling devices and/or in voltage monitoring systems. Modifications or variations described with respect to one of the embodiments may also be applicable to other embodiments unless noted otherwise. Features from different embodiments may be combined unless noted otherwise.

Any direct connection or coupling as shown in the drawings or described herein, i.e. any connection or coupling without intervening elements, may be replaced by an indirect connection or coupling, i.e. a connection or coupling comprising one or more intervening elements, and vice versa, as long as the general function of the connection or coupling, e.g. to transmit a certain kind of signal, to transmit a certain kind of information or to perform a certain kind of control, is essentially maintained. Connections or couplings may be wire-based connections or couplings or also wireless connections or couplings unless noted otherwise. Elements shown in the drawings of embodiments or devices may be implemented on a single chip in some embodiments, but may also be provided on two or more chips, and/or some components may be provided as discrete elements apart from integrated chips.

Some embodiments relate to sampling. Sampling as used herein may relate to generating output values based on an input signal in regular or irregular intervals. The output values may e.g. be generated using an analog-to-digital converter or a comparator.

Multi-channel sampling relates to sampling of a plurality of different input signals. The plurality of different input signals may e.g. be voltages to be monitored in a semiconductor device or system. In some embodiments, a single sampling device is used for sampling the plurality of input signals in an alternating fashion. In embodiments, switching between the input signals for sampling may be performed in a random order, and in irregular intervals. In this way, in some embodiments aliasing may be prevented or reduced.

"Random" as used herein also includes pseudo-random approaches, wherein e.g. random numbers or the like may be generated by a deterministic circuit such that the result appears to be random. Furthermore, the term random also includes approaches where some elements are random and other elements are determined in a deterministic manner based on the random elements.

A delay as used herein may be an additive delay or may be a jitter-type delay. An additive delay delays a current event (e.g. sampling) and following events (e.g. samplings), whereas a jitter-type delay delays only a current event (e.g. sampling).

Turning now to the figures, FIG. 1 illustrates a device according to an embodiment. A sampling device 10 receives a plurality of input signals via a plurality of channels 13.1, 13.2, . . . 13.N, collectively referred to as channels 13. The number N is not particularly limited and is an integer number greater than 1. The sampling device 10 may e.g. comprise an analog-to digital-converter or a comparator and outputs an output signal on an output channel 14. In some embodiments, input channels 13 may be coupled to different supply voltage rails in a system to enable monitoring of supply voltages. However, this is only an example, and other kinds of input signals or channels may also be used.

Sampling device 10 in the embodiment of FIG. 1 may be a single sampling device which may sample an input signal on one of channels 13.1, 13.2, . . . , 13.N at any given time. To select a channel for sampling, e.g. a multiplexer or similar device may be provided.

To control selection of a respective channel 13 for sampling, in the embodiment of FIG. 1, a sampling controller 11 is provided. Sampling controller 11 may comprise a circuit 15 to generate random or pseudo-random values based on which a respective channel 13 is selected for sampling. In embodiments, sampling controller 11 is adapted to change between channels 13 in an essentially random manner, and to change between channels in irregular intervals. For example, random delays may be added to a changing of channels in regular intervals to provide irregular intervals. By such a changing or switching between channels, as will be explained later in greater detail, aliasing may be mitigated in some embodiments without the need for analog anti-aliasing filters. Non-limiting implementation examples of the various components of FIG. 1 will also be described later in some more detail.

Figure 2:
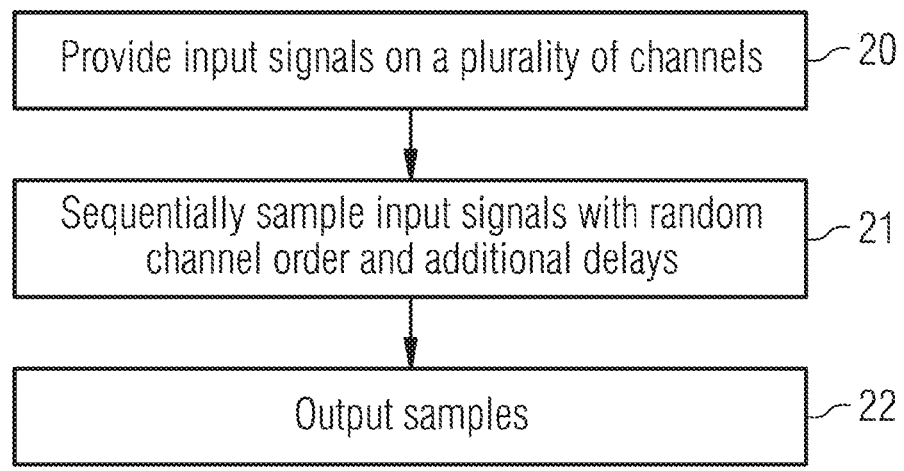
FIG. 2 is a flowchart illustrating a method according to an embodiment.

FIG. 2 illustrates a method according to an embodiment. The method of FIG. 2 may be implemented using the device of FIG. 1 or some of the devices described later, but may also be implemented independently therefrom. While the method is illustrated and will be described as a series of acts or events, the order in which the acts or events are described is not to be construed as limiting. For example, some of the acts or events may occur simultaneously in different parts of a circuit. For better understanding, the method of FIG. 2 will be described referring to the device of FIG. 1, but this is not to be construed as limiting.

At 20, the method comprises providing input signals on a plurality of channels. For example, a plurality of voltages associated with different voltage rails in a system may be provided. In an implementation, the signals may be provided on channels 13 in FIG. 1.

At 21, the input signals are sequentially sampled with a random channel order and additional delays, which leads to a random change between samples and irregular intervals between samplings, as explained with reference to FIG. 1. At 22, the method then comprises outputting the samples, e.g. via output channel 14 in FIG. 1.

Figure 3:
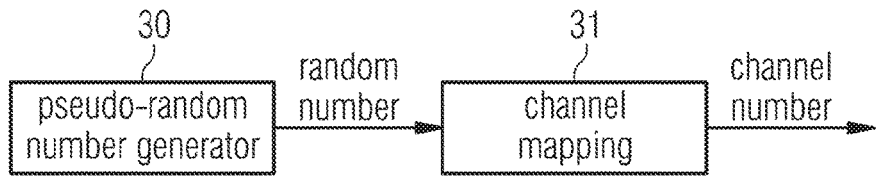
FIG. 3 is a block diagram illustrating a sampling controller according to an embodiment.

In FIG. 3 a block diagram illustrating a sampling controller according to an embodiment is illustrated, which may e.g. be used as sampling controller 11 in FIG. 1.

The sampling controller of FIG. 3 comprises a pseudo-random number generator 30 which outputs a (pseudo-) random number. A pseudo-random number generator generally generates a deterministic sequence which approximates a random sequence. The deterministic nature of pseudo-random number generator 30 in embodiments allows to guarantee timings and anti-aliasing properties not only on average, but also for a worst case scenario. In embodiments, a periodicity, if any, of the pseudo-random sequence may be sufficiently long to fulfill application requirements, depending on the number of channels and desired output signal properties. In embodiments, the sequence has an essentially uniform distribution of random values.

Figure 4:
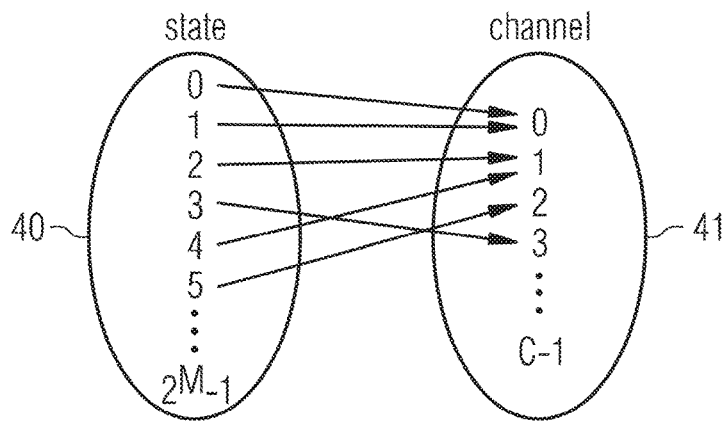
FIG. 4 illustrates an example for channel mapping for the embodiment of FIG. 3.

The random number generated by pseudo-random number generator 30 may e.g. be a M-bit value. The random number is fed to a channel mapping 31, which may e.g. be an M-to-L-bit lookup table, where the random number is mapped to C channels, C in embodiments being an integer number exceeding the actual number of channels (e.g. N in FIG. 1). C may be a binary number with L-bits, i.e. $C=2^L$. To illustrate this further, FIG. 4 illustrates an example for channel mapping. At 40, states of the random number generated by pseudo random number generator 30 is shown. If the random number is a M-bit number, (decimal) numbers or states from 0 to $2^M-1$ may be assumed by the random number. These states are mapped to channels 41 numbered from 0 to C−1, i.e. C channels. As mentioned, C may exceed a number of actual channels N. For example, C may correspond to the next binary number ($2^L$) exceeding N.

For channels 41 corresponding to actual channels (e.g. 13.1 to 13.N in FIG. 1), a corresponding channel number indicates that the signal on the corresponding channel is to be sampled. In case the random number is assigned to a "dummy channel", i.e. a channel 41 not corresponding to an actual channel, a delay, e.g. a delay of one clock cycle of the system, may be introduced. Therefore, the changing between channels is according to a random order and through these delays also the times between changes are non-uniform, i.e. irregular intervals.

Therefore, an increase in sampling time granularity may be obtained without extra effort merely by providing more states of a random number simply by introducing at least one dummy channel. The channel mapping of FIG. 4 may be implemented e.g. as a simple lookup table.

Figure 5:
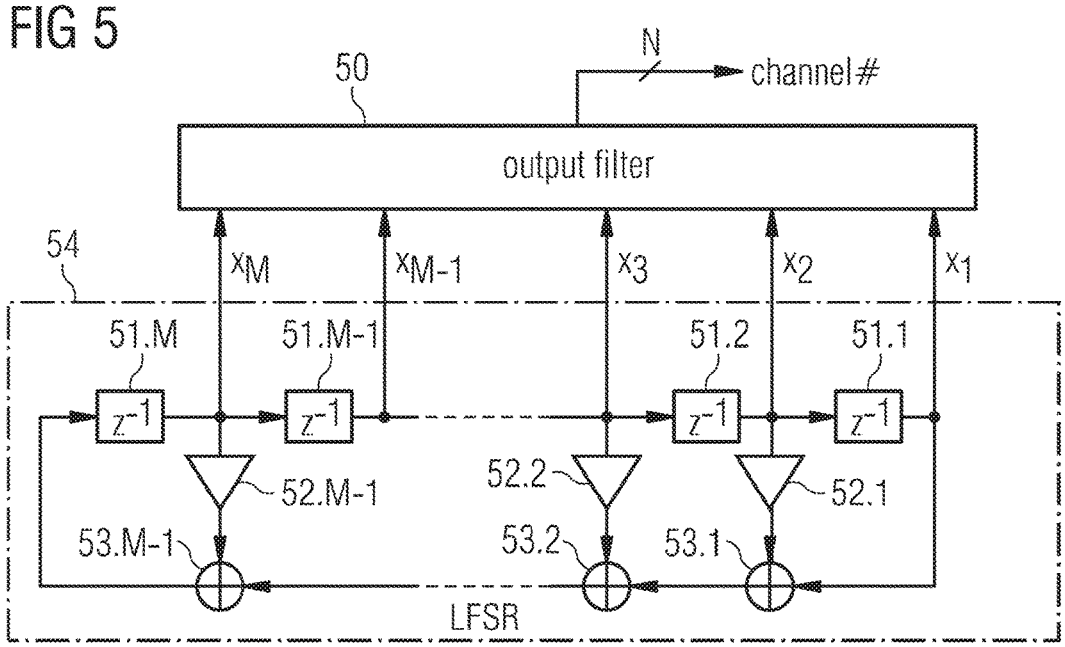
FIG. 5 is a circuit diagram illustrating a sampling controller according to an embodiment.

FIG. 5 illustrates an implementation example of a sampling controller according to an embodiment, which may operate essentially as described with reference to FIGS. 3 and 4. To generate random numbers, a linear feedback shift register (LFSR) is used, which may have a length P. The register as illustrated comprises a plurality of delay elements 51.1, 51.2, . . . , 51.M, a plurality of adders 53.1, 53.2, . . . , 53.M−1 and multipliers or amplifiers 52.1, 52.2, . . . , 52.M−1 with which weighting factors, which may be the same or different for all the multipliers/amplifiers 52, may be provided. In FIG. 5, the linear feedback shift register 54 has a length M. However, LFSRs with a length P, P>M, may be used. With a length P, if the feedback polynomial determined by the weighting factors mentioned is primitive, a random sequence produced has a period $m=2^L-1$.

M registers of the linear feedback shift register 54 are tapped to obtain values $x_1, x_2, \ldots, x_m$, each having a value of 1 or 0 and therefore forming a M-bit value. If M<P, the M-bit values still have a periodicity of $2^L-1$. Therefore, a desired periodicity of the random number sequence may be selected by selecting a length of the linear feedback shift register 54 accordingly.

At every update of the LSFR, e.g. at every clock cycle or a multiple thereof, by tapping M nodes or registers of the linear feedback shift register 54, a M-bit value with bits $x_1$ to $x_m$ is obtained. In an output filter 50, the channel mapping explained with reference to FIG. 4 may be performed, mapping the M-bit value generated by LFSR 54 to channel numbers.

Furthermore, more than one output state of the random number generator may be mapped to one channel. This is shown as an example in FIG. 4, where output states 0, 1 at 40 are mapped to channel 0 in 41, and output states 2, 4 in 40 in FIG. 4 are mapped to channel 1 in 41 of FIG. 4. With such a mapping, some channels may be sampled more often than others. Therefore, with channel mapping the sampling may be adapted to the needs of a particular application.

Figure 6:
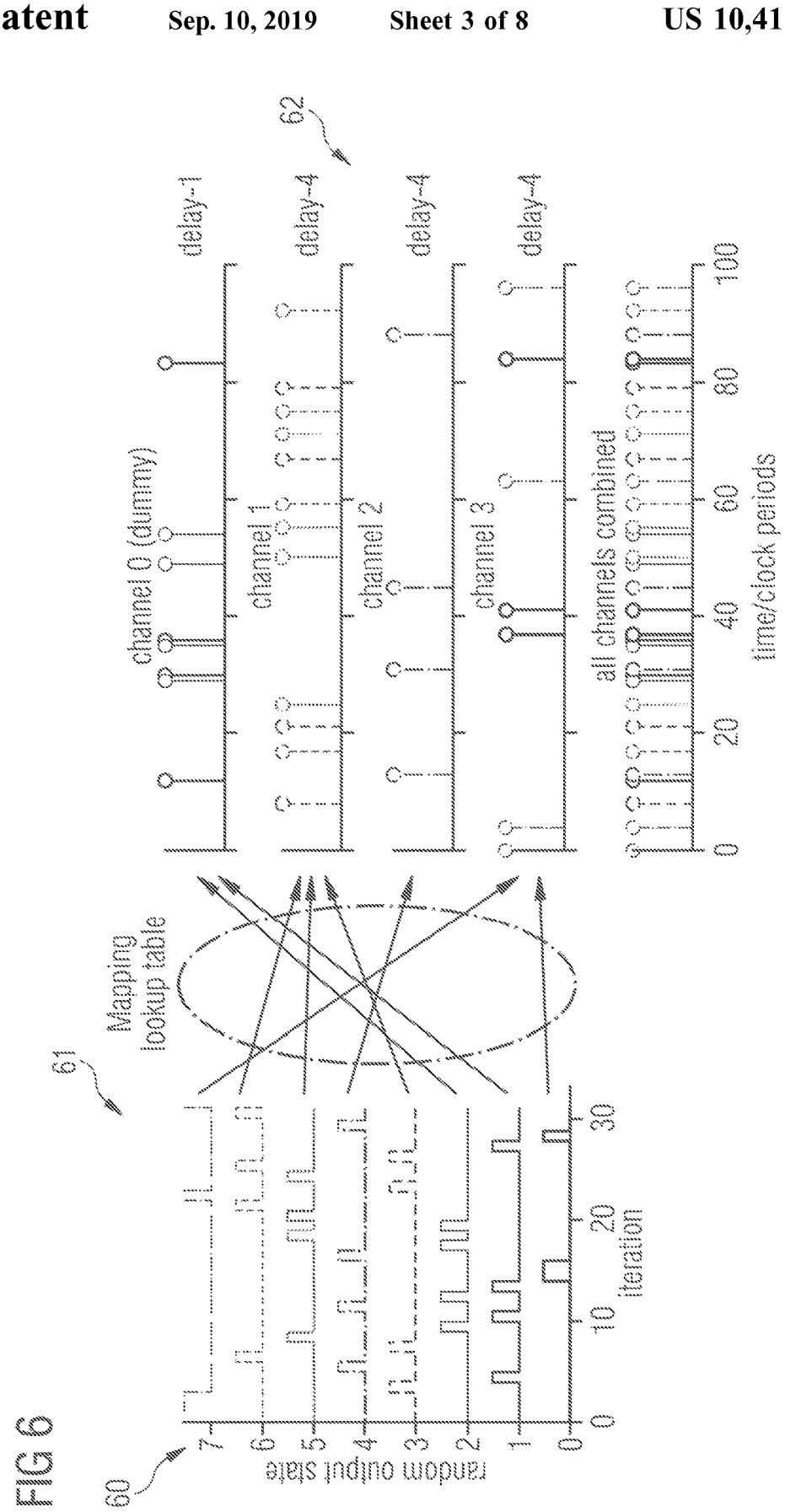
FIG. 6 illustrates an example illustrating operation of the embodiment of FIG. 5.

FIG. 6 illustrates an example operation generated by a 5-bit LFSR (P=5), e.g. LFSR 54 of FIG. 5, for three channels and a dummy channel.

The three least significant bits of the linear feedback shift register were used corresponding to eight different output states ($2^3=8$). An example for thus generated random output states is shown in a part 60 of FIG. 6. All eight output states in FIG. 6 have pulses with the same average frequency, but the order in which the output states appear is essentially (pseudo)random.

A part 61 in FIG. 6 illustrates an example for a channel mapping to channels which are shown in a part 62 of FIG. 6. In the example, a dummy channel (channel 0) and three input channels on which a signal is actually sampled (channel 1, channel 2 and channel 3) are shown. In the example shown, output states 1 and 2 are mapped to channel 0 (the dummy channel), output states 3, 5 and 6 are mapped to channel 1, output state 4 is mapped to channel 2 and output states 0 and 7 are mapped to channel 3. This results in average sampling frequencies in channels 1, 2 and 3 having a ratio 3:1:2.

In the example of FIG. 6, the sampling period is 4 clock cycles, such that after each sampling in one of channels 1, 2 and 3 a delay of 4 clock cycles follows. Channel 0 (the dummy channel) introduces an additive delay of 1 clock cycle.

The effect of the sampling control according to embodiments as described above, e.g. of random changing or switching between the channels and/or of introducing additional additive or jitter-type delays such that the sampling is performed in irregular intervals, will be explained in some more details referring to FIG. 7 to FIG. 11.

Figure 7:
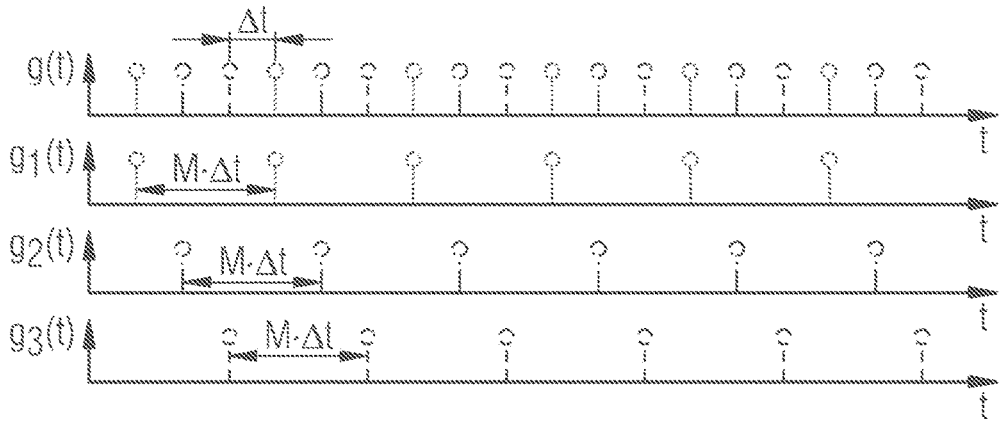

FIG. 7 illustrates a sampling for three channels according to a conventional round-robin scheme. $g_1(t)$ illustrates the sampling for the first channel, $g_2(t)$ for the second channel and $g_3(t)$ for the third channel. g(t) shows the combined sampling of all three channels. A sampling period in the example of FIG. 7 is Δt, sampling period being the time distance between two individual samplings in g(t) in this case. Δt may e.g. be a multiple of a clock period $t_{clk}$ of an underlying system clock. In a round-robin scheme, the channels are sampled successively in order, in the example of FIG. 7 first channel 1, then channel 2, then channel 3, then again channel 1 etc. A sampling period for each of the channels in this case is M·Δt, M being the number of channels (three in the example illustrated in FIG. 7). The effective sampling frequency $f_s$ for each of the M channels therefore in case of FIG. 7 is $$f_s = \frac{1}{M \cdot \Delta t}. \quad (1)$$

This effective sampling frequency is relevant for aliasing, i.e. in case the sampled input signal has frequency components higher than half the sampling frequency, this may lead to aliasing.

Figure 8:
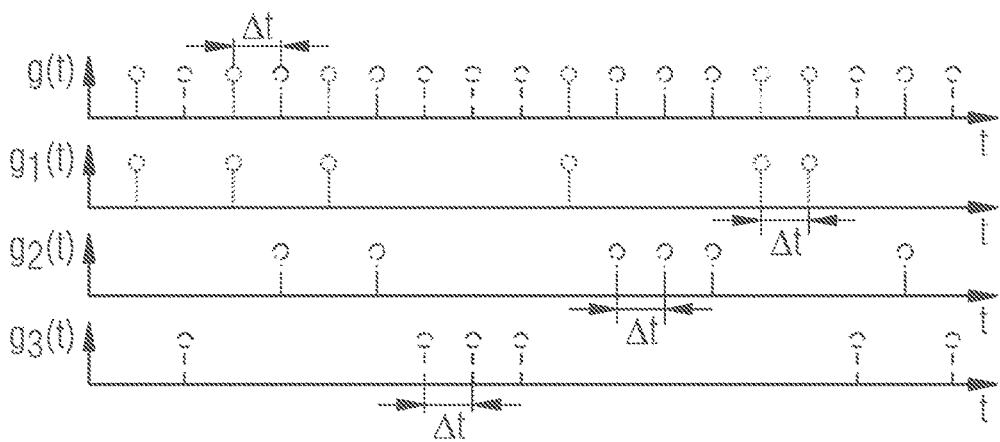

FIG. 8 shows a random sampling scheme where the switching or changing between the channels is performed with a random order (as already shown and explained with reference to FIG. 6). The random changing or switching between the channels effectively is equivalent to a so called random skip sampling (RSS) for each individual channel, where the skip probability q is q=(M−1)/M. The skip probability corresponds to the probability that with a sampling period of Δt, a sample in a channel is skipped. For example, for three channels, q=0.66, meaning that on average two of three samples are skipped. As can be seen in FIG. 8, this random skipping results in some greater gaps between samplings in any single channel, but also in samplings in each channel which might be only Δt or multiples thereof apart. Therefore, the effective sampling frequency $f_s$ for each of the channels increases to $$f_s = \frac{1}{\Delta t}. \quad (2)$$

Figure 9:
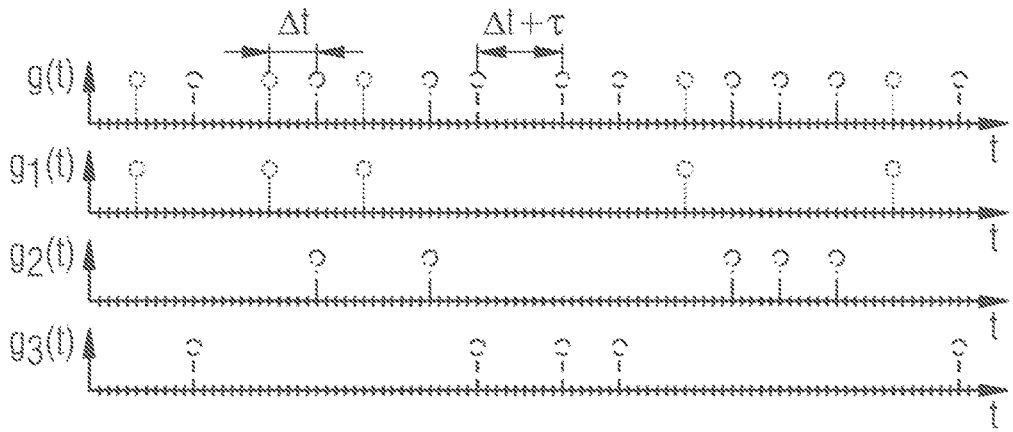

Therefore, aliasing may be reduced or mitigated, as the effective sampling frequency is now higher by a factor M. In FIG. 9 additional delays τ which are multiples of full clock periods $t_{clk}$ are randomly inserted. This may be performed as explained above in some embodiments by mapping some (pseudo-) random output states of a LSFR or other (pseudo-) random numbers to dummy channels, a mapping to a dummy channel indicating a delay of one clock period $t_{clk}$. This delay in embodiments is introduced as an additive delay. An example for this approach has been discussed above referring to FIG. 6. With this, the effective sampling frequency increases to $$f_s = \frac{1}{t_{clk}}. \quad (3)$$

In real life circuits, the bandwidth of input signals may already be limited to below half the clock frequency (i.e. the Nyquist frequency in case of FIG. 9). Therefore, in many systems by introducing delays based on the clock period as explained with reference to FIG. 9 and as may be obtained by channel mapping as explained with reference to FIG. 4, aliasing may be avoided or at least greatly reduced.

In case a higher effective sampling frequency is needed, in some embodiments random additive or jitter-type analog delays with a granularity of a fraction of a clock period may be introduced. If these delays have a time granularity of Δt*, then the effective sampling frequency increases to $$f_s = \frac{1}{\Delta t^*}. \quad (4)$$

In some embodiments, the analog delay may not be discrete, but a continuous time random variable. An example for additional uniform jitter-type delays with a maximum length of a clock period is shown in FIG. 10. Each sampling occurs essentially randomly at a point in time within the "bars" illustrated. A delay added to one of the sampling points does not influence later sampling points, such that here a jitter-type delay is illustrated. However, random analog delays may also be added as additive delays in other embodiments. In this case, the effective sampling frequency approaches infinity, $$f_s \to \infty \quad (5)$$

as the granularity of a continuous time variable in the ideal case is 0. Therefore, with an additional analog delay of fractions of a clock period $t_{clk}$ the Nyquist frequency ($f_s$/2) may be further increased.

In the example sampling approaches of FIGS. 7-10, the channel order is essentially completely random. In such embodiments, for a specific channel a comparatively long time may occur between two samplings, if the random order just causes the specific channel not to be sampled for an extended period of time. For some applications, it may be desirable to ensure that each channel is sampled at least once during a given time period, for example in some real time applications. This may help to keep information based on the sampling always up to date. Example sampling approaches according to some embodiments which may be used to ensure such a behavior will now be discussed referring to FIGS. 18-20.

Figure 18:
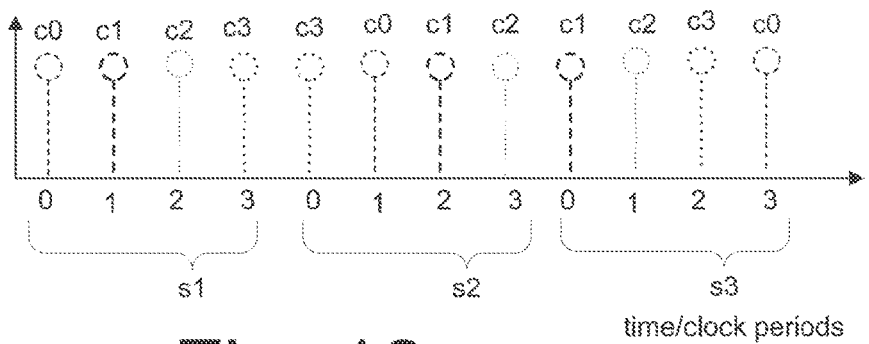
FIGS. 18 and 19 are explanatory diagrams to explain further multi-channel sampling approaches.

FIG. 18 illustrates sampling times for four channels c0 to c3 over time. The number of four channels is only used for illustration purposes, and other numbers of channels may equally be used.

In the sampling approach of FIG. 18, in each of a plurality of successive sequences s1, s2, s3 . . . , all channels c0 to c3 are sampled once. In order to introduce randomness to sampling, the first channel to be sampled in each sequence s1-s3 is selected randomly, for example based on a pseudo-random number. In this way, in the example of FIG. 18 for sequence s1 channel c0 is selected randomly as the first channel to be sampled (position 0 if sequence s1), for sequence s2 channel c3 is randomly selected to sampled first, and for sequence s3 c1 is randomly selected to be sampled first.

The remaining channels (other than the first-sampled one) then follow in each sequence in some order which may be determined in a deterministic manner, for example by increasing the channel number from the starting channel modulo the number of channels (modulo 4 in FIG. 18). In this way, in the example of FIG. 18 for sequence s1 the channel order c0, c1, c2, c3 results, for sequence s2 the channel order c3, c0, c1, c2, and for sequence s3 the channel order c1, c2, c3, c0.

Instead of a deterministic selection of the remaining channels, also here a random selection from the respective remaining channels may be used in other embodiments. For example, for sequence s1 c0 is randomly selected as first channel to be sampled, the next channel the could be randomly selected from c1, c2, c3 (the remaining channels), the next then from the remaining two channels, and the last as the still remaining channel. In any case, in this way the channel order is still random as the starting channel for each sequence is random, but it is ensured that within each sequence each channel is sampled.

Figure 19:
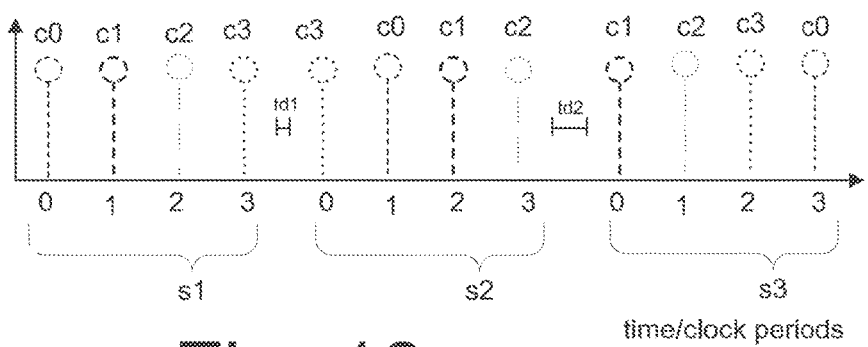

Also with the sampling scheme of FIG. 18, additional delays may be introduced, as explained above referring to FIGS. 9 and 10. Such additional delays may be introduced between sequences, as shown in FIG. 19, where between sequence s1 and sequence s2 a delay td1 and between sequence s2 and sequence s3 a delay td2 is introduced. As will be explained further below referring to FIG. 20, these delays td1, td2 may be introducing dummy channel mapping as already explained referring to FIG. 4 when selecting the first channel of each sequence, thus generating delays being a multiple of the clock period. Additionally or alternatively, random additive jitter or analog delays with a granularity of a fraction of a clock period may be used, for example for delays between sequences as shown in FIG. 19 or also as delay variations between individual samplings.

Figure 20:
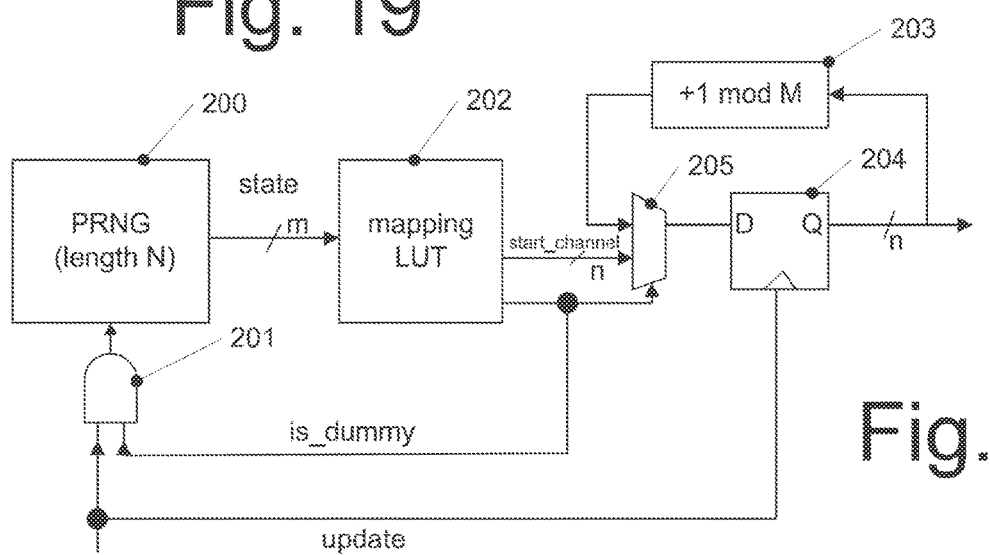
FIG. 20 is a schematic block diagram illustrating a sampling controller according to an embodiment.

FIG. 20 is a schematic diagram illustrating a controller according to an embodiment. The controller of FIG. 20 may for example be used to control a sampling as illustrated in FIG. 19. It should be noted that the schematic diagram of FIG. 20 is not to be taken as a precise circuit diagram, but is intended to illustrate the general functioning of such a device.

The controller of FIG. 20 comprises a random number generator 200 of length m to generate a signal state. The signal state thus generated is fed to a lookup table 202 for mapping. Lookup table 202 may be implemented as illustrated in FIG. 4 by mapping some numbers to actual channels (for example channels c0 to c3 in the example of FIG. 19), while other values of state are mapped to a dummy channel. In case of mapping to an actual channel, this represents a start channel (variable start channel) used for the start of the respective next sequence (for example s1 or s3 in FIG. 19). In case the mapping results in a dummy channels this signal is provided as signal is dummy via a logic gate 201 to pseudorandom number generator 200 to generate a next number with the next clock pulse, thus causing a delay (for example td1, td2 in FIG. 19).

The start channel is then output as channel number to be sampled via latch 204.

After the start channel has been sampled, via a calculation 203 the channel number is increased by 1 mod M, M being the number of channels, to then let the other channels follow consecutively within each sequence after the start channel, as illustrated in FIGS. 18 and 19.

A signal update counts the sequences, that after a sequence is finished the next sequence starts with a new randomly chosen channel to be sampled and possibly a new delay.

As already mentioned with respect to FIG. 18, besides the calculation at 203, other ways, both deterministic and random, to select the remaining channel after the randomly selected first channel, may be employed.

In some embodiments, using this scheme as described above, pseudorandom number generator may have a very long period or even be actually random, thus resulting in a random channel order, while still guaranteeing that each channel is to be sampled one within a given time frame, for example each sequence.

Next, with reference to FIG. 11, possible effects of sampling as described above in a voltage monitoring system serving as an example system will be explained. These effects may be avoided by using techniques as described above between the channels for sampling and introduction of additional delays together with taking a sufficient number of samples.

In the example of FIG. 11, a DC (direct current) voltage level on a voltage rail is at a level designated A, with fluctuations as indicated by a dashed line x(t). Vth is a threshold value used for voltage monitoring. A DC level exceeding the threshold value Vth corresponds to an overvoltage, which is to be detected by the voltage monitoring system. In the example of FIG. 11, the first five samples are taken as indicated by solid vertical lines. These five samples are essentially randomly spaced in the example of FIG. 11. When these samples are fed to a comparator as indicated with y(t) and y[n] in the lower part of FIG. 11, five time a 1 indicating an exceeding of the threshold and only one time a 0 would be output, indicating an overvoltage although in fact no overvoltage is present. Therefore, in embodiments a sufficient number of samples is used for making decisions which may avoid this problem. For example, for a perfect random sampling scheme with a constant sampling probability over time, the probability for such a wrong decision is $2^{-N}$, where N is the number of samples on which a decision is based and if Vth equals A. Therefore, with the random sampling scheme discussed above, by using a sufficient number of samples a probability of a wrong decision may be made small. The number of samples selected may depend on a desired confidence level of the decision, i.e. a desired probability that the decision is correct.

In other words, in some embodiments to fully benefit from the increased effective sampling frequency of equations (2) to (5), it must be insured that a sufficiently high number of samples is used.

With the random sampling schemes discussed above, with a single sampling device (e.g. a single comparator or a single analog-to-digital converter (ADC)) a plurality of channels may be sampled, while aliasing may be reduced or avoided.

This may provide various advantages in some embodiments. For example, in some embodiments an integration process with other components may be easier, e.g. as regards interfacing, as less interfaces may be needed and/or input-output-structures are bundled and hierarchies well defined.

Figure 12:
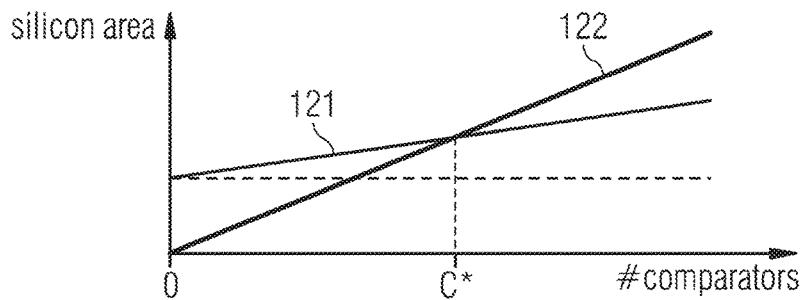
FIG. 12 is a diagram illustrating chip area requirements in some embodiments compared to conventional solutions.

Furthermore, in some embodiments, the chip area may be reduced in particular when a larger plurality of channels is to be sampled. This is shown schematically in FIG. 12 with distinct comparators as sampling device. A curve 120 shows the silicon area required if for each channel a separate comparator is provided, and 121 illustrates the silicon area required when a single comparator with sampling schemes as discussed above is used. As can be seen, over a certain number of channels C*, using the techniques described above with a single comparator saves silicon area. This is essentially because with a single comparator, each additional channel only needs an additional multiplexing switch, which is usually much smaller in terms of area required than a comparator.

Furthermore, in some embodiments using techniques described above may make maintenance and circuit design easier. In circuit design, often various iterations with the goal of reaching a constant improvement of the design have to be made. A high number of circuit elements may result in a high effort in this process. With providing common circuitry, e.g. a single sampling device, this effort may be reduced.

Also, in some embodiments testing may be made easier. A centralized sampling device, e.g. analog-to-digital converter, may be equipped with a built-in self-test feature (BIST), which enables a significant increase of test coverage and savings in test times compared to an approach where a plurality of individual sampling devices has to be tested and provided with test circuitry. Furthermore, regarding functional safety related topics a benefit may be obtained. A BIST-mechanism as described above may also be performed during chip start-up and/or in regular or irregular intervals in a running system. For example, a voltage monitoring system employing techniques as described above may be used as an independent observer of over- and/or under-voltage conditions, such a self-test approach allows preventing latent faults. With a single sampling device, such self-test schemes are significantly easier to implement compared to approaches using a plurality of sampling devices.

In some embodiments, threshold voltages in a voltage monitoring system may be easier changed without additional verification being necessary.

Furthermore, common used functionality (i.e. a single sampling device) simplifies debugging and represents a base for comparison between different channels.

Next, an application of a sampling controller as described above in a voltage monitoring system will be described in more detail. It is to be understood that the voltage monitoring system described in the following serves merely as an application example of the sampling controller described above, and the sampling controllers and techniques described above may be applied in all cases where a plurality of input signals on a plurality of channels need to be sampled.

Figure 13:
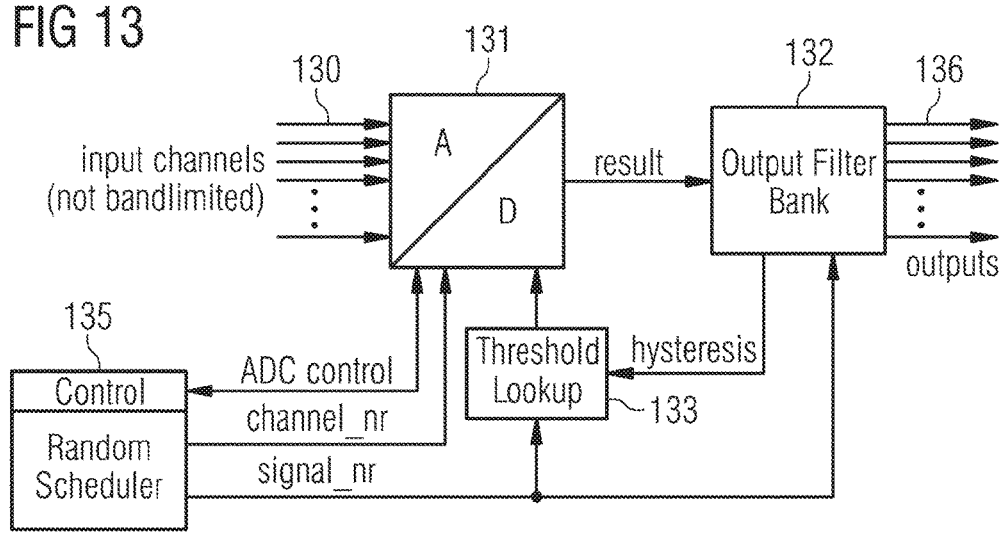
FIG. 13 illustrates a voltage monitoring system according to an embodiment.

FIG. 13 illustrates a block diagram of a voltage monitoring system according to an embodiment. The voltage monitoring system of FIG. 13 comprises an analog-to-digital converter (ADC) 131 as sampling device having M multiplexed input channels 130.

Analog-to-digital converter 131 may e.g. be a successive approximation register (SAR) analog-to-digital converter or any other suitable kind of analog-to-digital converter. Analog-to-digital converter 131 in the embodiment of FIG. 13 serves to compare voltages on input channels 130 with predefined thresholds. In particular, a digital representation of the voltage may be compared to a digital value. For example, the analog-to-digital converter 131 may have a resolution of N bits in some embodiments. In other embodiments, 1-bit values may be output, which may be the result of a comparison of the N-bit value with a threshold value. Such threshold values may be provided by a threshold storage 133 which stores threshold values for different channels depending on a signal signal_nr. A controller 135 serves for randomly scheduling the sampling (i.e. for sampling control) and for otherwise controlling the analog-to-digital converter via an ADC control channel. The analog-to-digital converter then announces if the analog input signal of the respective sample channel is greater than the voltage equivalent of the threshold value, such that the analog-to-digital converter in this case essentially operates as a comparator. Apart from the different outputs, the two approaches (full conversion or comparing with a threshold) mainly differ in the time required for the conversion. For example, for an SAR-analog-to-digital converter, the conversion with comparison (fast compare conversion) is ideally N times faster compared to the normal full conversion. Start of a self-test may be controlled by a signal from controller 135 to analog-to-digital converter 131, and the result (ok or not ok) may be fed back to controller 135 via the ADC control channel.

Figure 17:
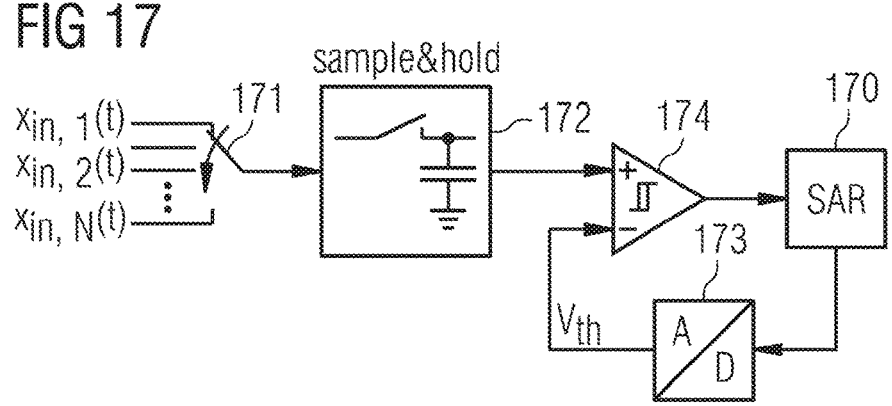
FIG. 17 illustrates a voltage monitoring system according to some embodiments using a particular implementation of an analog-to-digital converter.

In FIG. 17, the structure of such a SAR analog-to-digital filter is illustrated. Via a multiplexer 171, voltages on different input channels (e.g. 130 in FIG. 13) are provided to a sample and hold circuit 172 that samples the input values and holds them, i.e. provides a constant output as sampled value, until the next sampling time. An output of sample and hold circuit 172 is input to a positive input of a comparator 174. An output of comparator 174 is provided to a successive approximation register 170. A digital-to-analog converter 173 provides a threshold value $V_{th}$ in analog form to a negative of comparator 174. The input to digital-to-analog converter 173 may be modified based on a threshold e.g. provided by storage 133 to enable a fast comparison, as explained above.

In other embodiments, other types of analog-to-digital converters than SAR analog-to-digital converters may be used. If the result of a comparison is needed, however, SAR analog-to-digital converters may be most efficient in terms of speed and area requirements. With other types of analog-to-digital converters, an additional comparator may be needed to compare an output result of the analog-to-digital converter with a desired threshold value.

Controller 135 controls sampling of input signals on input channels 130 via the ADC control channel and a signal channel_nr. For example, a signal via the ADC control channel may e.g. close a switch to connect one of channels 130 with analog-to-digital converter 131. Another signal may cause the switch to open again and cause conversion of the thus sampled value. Channel_nr selects the switch to be closed, i.e. which channel is to be sampled. The control may be as explained with reference to FIGS. 3 to 11, i.e. a random switching between the channels, with additional additive and/or jitter-type delays introduced, e.g. delays corresponding to a clock period as explained with reference to FIG. 9 or additional delays, e.g. analog delays, smaller than a clock period as explained with reference to FIG. 10. By employing such random sampling schemes aliasing may be prevented or mitigated without the use of analog anti-aliasing filters.

Signal signal_nr may essentially correspond to channel_nr and controls selection of the respective threshold and selection of a respective output channel of a filter 132 comprising a multiplexer and outputting output signals corresponding to the input signals on input channels 130 via a respective output channel 136. Filter 132 may comprise a deglitch filter (an example will be described later).

In the embodiment of FIG. 13, each input channel 130 has at least one, but possibly more than one associated output channels 136. Output signals on output channels 136 in the embodiment of FIG. 13 are virtual representations of the output of a discrete comparator (implemented by ADC 131 with corresponding thresholds provided by 133). Therefore, similar to a real comparator, there may be independent falling and rising threshold values, their difference constituting a hysteresis. Such a hysteresis increases the immunity against noise when a voltage on a respective input channel is close to a respective threshold value in some embodiments. The hysteresis may be adjusted by modifying the thresholds, which may be controlled by filter 132 as shown in FIG. 13.

Next, filter 132 will be described in more detail referring to FIGS. 14 and 15.

Figure 14:
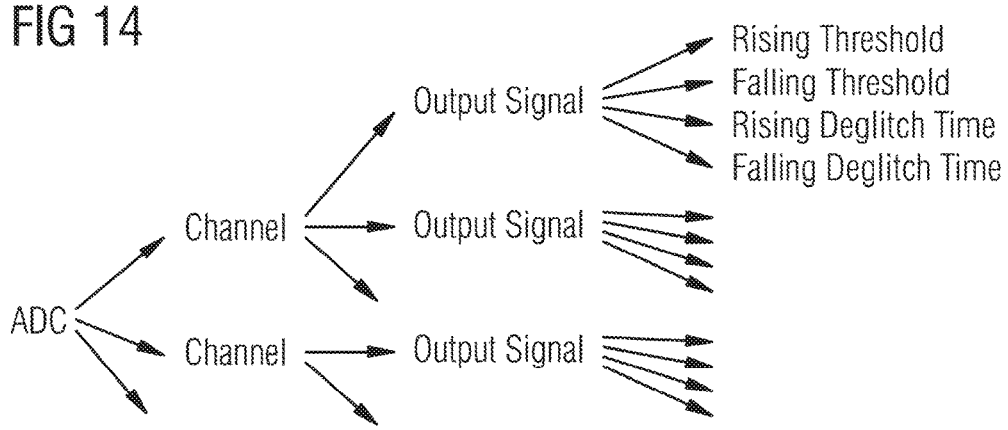
FIG. 14 illustrates a channel and signal hierarchy of some embodiments.

FIG. 14 illustrates a "channel and signal hierarchy", i.e. illustrates how various channels and signals and their properties depend on each other. The analog-to-digital converter (e.g. 131 in FIG. 13) receives signals from a plurality of channels (e.g. 130 in FIG. 13). For each of the channels, one or more output signals are output (e.g. at output channels 136 of FIG. 13). Each output signal is generated essentially based on a comparison with a threshold, which may have hysteresis, such that a rising threshold (the output signal changes state when the input signal on the channel rises above the rising threshold) and a falling threshold (the output signal changes state again when the input signal falls below the falling threshold) are provided. Correspondingly, a deglitch filter may use a rising deglitch time and a falling deglitch time. The rising and falling deglitch times define a filter function of the output signal. They specify for how long the output of the analog-to-digital converter 131 (i.e. the effective comparator output) needs to remain stable for the filter output to change. Different rising and falling deglitch times may be used to adjust to the severity of a condition (e.g. severity of over-voltage), but they also influence the immunity against disturbances in order not to make a wrong decision. The threshold comparison result must be constant for a time period $t_{deglitch}$ corresponding to the rising deglitch times in case the rising threshold is exceeded or corresponding to the falling deglitch time in case the input signal falls below the falling threshold in order to propagate it to the output of the filter. Otherwise, the filter output keeps its previous value. If a sample of the input signal with a different value occurs before $t_{deglitch}$ is over, an internal state of the filter is reset and the process starts anew. This behavior results in a quasi-low pass filter behavior of the deglitch filter.

Figure 15:
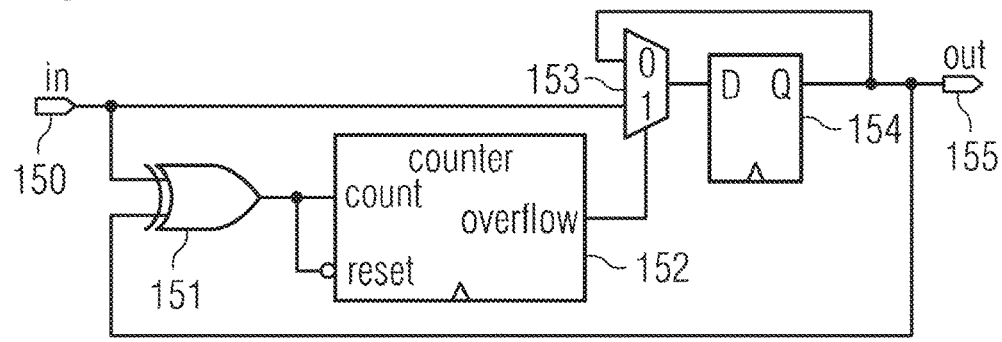
FIG. 15 illustrates a deglitch filter usable in the embodiment of FIG. 13.

FIG. 15 shows an implementation example of a suitable deglitch filter. The filter of FIG. 15 has an input terminal 150 and an output terminal 155. An exclusive or gate (XOR gate) 151 receives a signal at input terminal 150 as well as a signal from output terminal 155. An output of XOR gate 150 is fed to a counter input of a counter 152. An inverted output of XOR gate 151 is provided to a reset input of counter 152. As long as input 150 and output 155 have the same value, an output of XOR gate 151 is 0, resetting the counter 152. If the input signal at input 150 then changes, a logic one is applied to the count input of counter 152, and counter 152 starts counting with each clock period of a clock signal provided to counter 152, and a logic zero is provided to the reset input of counter 152 preventing a reset. As soon as the counter value reaches an overflow value (which corresponds to the average deglitch time $t_{deglitch}$) the overflow output of counter 152 controls a multiplexer 153 to apply the signal at input 150 to a data input D of a D-flipflop (also referred to as D-latch) 154. After one clock period, this signal is then forwarded to output 155. This causes the output signal to be the same as the input signal, which causes the reset of counter 152 and a resetting of the overflow signal, which switches the multiplexer 153 to connect the output Q of D-flipflop 154 with the data input D of D-flipflop 154. This keeps the output signal at output 155 at the same value. When the input signal 150 changes again, the counting starts anew.

As already explained, controller 135 may be implemented as explained above to perform a random scheduling. There are various possibilities how the generated signals (as explained e.g. with reference to FIGS. 6 to 10) may be used to control the sampling. In one approach, the controller 135 selects signals directly. Then, the corresponding channel is sampled and converted by ADC 131 with the respective threshold. After this, another signal is selected, and the conversion is started anew. This approach may be advantageous where output signals associated with a same input channel require different average sampling frequencies.

In another approach, controller 135 selects a channel, samples it via analog-to-digital converter 131 and the conversions are performed successively for all output channels 136 associated with the input channel (e.g., for one input channel two comparisons with different thresholds may be performed, one to detect possible overvoltage and one to detect possible undervoltage). In this approach, the time required for sampling needs only to be spent once per input channel and not once per output signals. The order in which the comparison with the threshold values is performed may be arbitrary as the sampled voltage is held internally in analog-to-digital converter 131. The following approach is in particular advantageous if many conversions with different thresholds must be performed on a channel, in particular if they take longer than a full conversion to an M-bit value. In this case, a full conversion to an N-bit value may be actually performed, followed by digital comparisons in the digital domain on the basis of the full resolution conversion result. For an ideal N-bit successive approximation register ADC more than N outputs associated with one channel would be required to make the full conversion faster for this channel.

Using a pseudo-random generator as explained previously may be used to ensure that sufficient samples are sampled during a time within which the voltage monitoring system needs to react. For example, for safety applications a voltage monitoring system needs to react within a defined time frame. With real random numbers, a particular channel may not be sampled for a long time. The probability for a channel not to be sampled goes exponentially towards 0 with time, but it cannot be guaranteed that a channel is actually sampled within the given period. A pseudo-random number generator generates a deterministic sequence which approximates a random sequence. When, as in the embodiment with a linear feedback shift register as described above, such a pseudo-random generator is used, the deterministic nature enables to guarantee timing and anti-aliasing properties not only on average, but also for the worst case.

Figure 16:
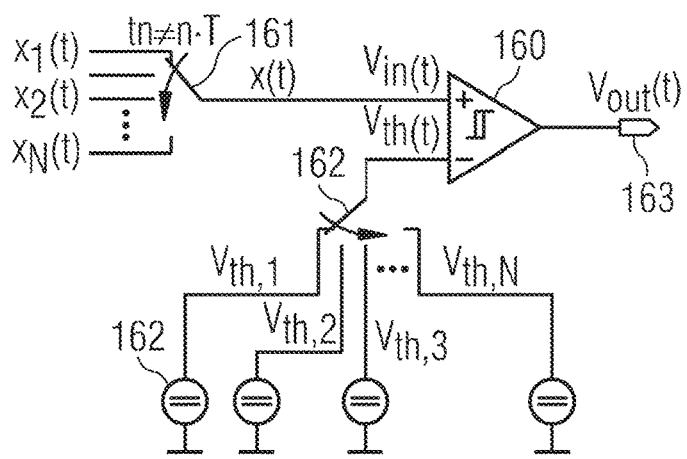
FIG. 16 illustrates an alternative implementation of a voltage monitoring system according to an embodiment.

Instead of an analog-to-digital converter, in particular an SAR ADC, also other sampling components may be used, e.g. comparators with varying threshold. A corresponding example embodiment is illustrated in FIG. 16. In FIG. 16, a plurality of input channels are selectable via a multiplexer (represented as a switch) 161 to be fed to a positive input of a comparator 160. Furthermore, a plurality of threshold voltages are generated by a plurality of voltage sources 162. A threshold voltage of the plurality of threshold voltages $V_{th}, 1 \ldots, V_{th}, N$ may be selected via a multiplexer 162, also represented as a switch. Multiplexers 161, 162 may be controlled by a sampling controller as explained above to perform a random sampling as explained above. An output representing the result of the comparison is provided at an output 163. This output may be subjected to deglitch filtering, and be multiplexed to a plurality of output signals as explained above.

According to some embodiments, the following non-limiting examples are provided:

Example 1

A device for sampling input signals, comprising:
a plurality of input channels configured to receive a plurality of input signals,
a sampling device configured to selectively sample an input signal on one of the plurality of input channels, and
a sampling controller, the sampling controller configured to control the sampling device such that the sampling device sequentially samples input signals from the plurality of channels with a random channel order and additional delays to provide non-uniform sampling periods between individual samplings.

Example 2

The device of example 1, wherein the sampling controller comprises a pseudo-random number generator, wherein the random channel order and/or the additional delays are based on random numbers generated by the pseudo-random number generator.

Example 3

The device of example 2, wherein the pseudo-random number generator comprises a linear feedback shift register.

Example 4

The device of example 2 or 3, wherein the sampling controller comprises a channel mapper configured to map the random number generated by the pseudo-random number generator to the plurality of input channels.

Example 5

The device of example 4, wherein at least some of the pseudo-random numbers are mapped to dummy channels causing the additional delays.

Example 6

The device of any one of examples 4-5, wherein the channel mapper comprises a lookup table.

Example 7

The device of any one of examples 1-5, wherein the additional delays comprise delays being integer multiples of a clock period of a clock clocking the device, a sampling period unmodified by the additional delay being an integer multiple of the clock period.

Example 8

The device of any one of examples 1-7, wherein the additional delays comprise analog delays with a duration smaller than a clock period of a clock clocking the device.

Example 9

The device of any one of examples 1-8, wherein the sampling device comprises a comparator.

Example 10

The device of example 9, further comprising a plurality of threshold value sources, the plurality of threshold value sources being selectively coupleable to the comparator based on a signal from the sampling controller.

Example 11

The device of any one of examples 1-10, wherein the sampling controller is configured to control the sampling such that the sampling occurs in a plurality of successive sequences, wherein a first channel within each sequence is selected randomly, and wherein each of the plurality of channels other than the first channel occurs at least once in the sequence.

Example 12

The device of example 11, wherein the remaining channels are selected deterministically after the first channel.

Example 13

The device of any one of examples 1-12, wherein the sampling device comprises an analog-to-digital converter.

Example 14

The device of example 13, wherein the analog-to-digital converter comprises a successive approximation register analog-to-digital converter.

Example 15

The device of any one of examples 1-14, further comprising a deglitch filter coupled to an output of the sampling device.

Example 16

The device of any one of examples 1-15, wherein the device comprises a plurality of output channels, wherein every input channel is associated with at least one output channel.

Example 17

The device of any one of examples 1-16, wherein the sampling controller is configured to start a built-in self-test of the sampling device.

Example 18

The device of any one of examples 1-17, wherein the additional delays comprise at least one of additive delays or jitter-type delays.

Example 19

A voltage monitoring system, comprising:
a device as defined in any one of examples 1-18, wherein the plurality of input channels are associated with a plurality of voltages to be monitored.

Example 20

The system of example 19, further comprising a threshold storage to provide variable thresholds, wherein the sampling device is configured to compare voltages on the plurality of input channels with respective threshold stored in the threshold storage.

Example 21

The system of example 20, wherein for each comparison a first threshold value and a second threshold value to provide hysteresis are provided.

Example 22

A method, comprising:
providing input signals on a plurality of channels, sequentially sampling the input signals with random channel order and additional delays between samplings to provide non-uniform sampling periods, and
outputting the sampled input signals.

Example 23

The method of example 22, wherein sequentially sampling the input signal with random channel order comprises repeatedly selecting a first channel of the plurality of channels randomly for sampling, and then selecting the remaining channels of the plurality of channels other than the first channel for sampling.

As can be seen from the above explanations, a plurality of modifications and variations are possible. Therefore, the embodiments described above are not to be construed as limiting in any way.

The invention claimed is:

1. A device for sampling input signals, the device comprising:
a plurality of input channels configured to receive a plurality of input signals;
a sampling device configured to selectively sample an input signal on one of the plurality of input channels; and
a sampling controller comprising:
a pseudo-random number generator configured to generate one or more random numbers; and
a channel mapper configured to map the one or more random numbers generated by the pseudo-random number generator to the plurality of input channels,
wherein the sampling controller is configured to control the sampling device to cause the sampling device to sequentially sample input signals from the plurality of input channels with a random channel order and additional delays to provide non-uniform sampling periods between individual samplings,
wherein at least one of the random channel order or the additional delays is based on the one or more random numbers generated by the pseudo-random number generator, and
wherein the channel mapper is further configured to map at least some of the one or more random numbers to dummy channels causing the additional delays.

2. The device of claim 1, wherein the pseudo-random number generator comprises a linear feedback shift register.

3. The device of claim 1, wherein the channel mapper comprises a lookup table.

4. The device of claim 1, wherein the additional delays comprise delays being integer multiples of a clock period of a clock clocking the device, a sampling period unmodified by the additional delays being an integer multiple of the clock period.

5. The device of claim 1, wherein the additional delays comprise analog delays with a duration smaller than a clock period of a clock clocking the device.

6. The device of claim 1, wherein the sampling device comprises a comparator, the device further comprising a plurality of threshold value sources, the plurality of threshold value sources being selectively coupleable to the comparator based on a signal from the sampling controller.

7. The device of claim 1, wherein the sampling controller is configured to control the sampling device at least in part by causing the sampling device to sample in a plurality of successive sequences, wherein a first input channel within each sequence is selected randomly, and wherein each of the remaining input channels of the plurality of input channels other than the first input channel occurs at least once in the sequence.

8. The device of claim 7, wherein the remaining input channels are selected deterministically after the first input channel.

9. The device of claim 1, further comprising a deglitch filter coupled to an output of the sampling device.

10. The device of claim 1, wherein the device comprises a plurality of output channels, wherein every input channel is associated with at least one output channel.

11. The device of claim 1, wherein the sampling controller is configured to start a built-in self-test of the sampling device.

12. The device of claim 1, wherein the additional delays comprise at least one of additive delays or jitter-type delays.

13. A voltage monitoring system comprising:
a device for sampling input signals, the device including:
a plurality of input channels configured to receive a plurality of input signals;
a sampling device configured to selectively sample an input signal on one of the plurality of input channels; and
a sampling controller comprising:
a pseudo-random number generator configured to generate one or more random numbers; and
a channel mapper configured to map the one or more random numbers generated by the pseudo-random number generator to the plurality of input channels,
wherein the sampling controller is configured to control the sampling device to cause the sampling device to sequentially sample input signals from the plurality of input channels with a random channel order and additional delays to provide non-uniform sampling periods between individual samplings,
wherein at least one of the random channel order or the additional delays is based on the one or more random numbers generated by the pseudo-random number generator,
wherein the channel mapper is further configured to map at least some of the one or more random numbers to dummy channels causing the additional delays, and
wherein the plurality of input channels are associated with a plurality of voltages to be monitored.

14. The voltage monitoring system of claim 13, further comprising a threshold storage configured to provide variable thresholds, wherein the sampling device is configured to compare a respective voltage on the plurality of input channels with a respective threshold stored in the threshold storage.

15. The voltage monitoring system of claim 14, wherein the voltage monitoring system is configured to provide, for each comparison, a first threshold value and a second threshold value to provide hysteresis.

16. The voltage monitoring system of claim 13, wherein the additional delays comprise delays being integer multiples of a clock period of a clock clocking the voltage monitoring system, a sampling period unmodified by the additional delays being an integer multiple of the clock period.

17. The voltage monitoring system of claim 13, wherein the additional delays comprise analog delays with a duration smaller than a clock period of a clock clocking the voltage monitoring system.

18. A method comprising:
providing input signals on a plurality of input channels;
generating one or more random numbers;
mapping the one or more random numbers to the plurality of input channels;
sequentially sampling the input signals with a random channel order and additional delays between samplings to provide non-uniform sampling periods, wherein at least one of the random channel order or the additional delays is based on the one or more random numbers; and
outputting the sampled input signals,
wherein mapping the one or more random numbers to the plurality of input channels comprises mapping at least some of the one or more random numbers to dummy channels causing the additional delays.

19. The method of claim 18, wherein sequentially sampling the input signals with the random channel order comprises repeatedly selecting a first channel of the plurality of input channels randomly for sampling, and then selecting remaining channels of the plurality of input channels other than the first channel for sampling.

20. The method of claim 18, wherein mapping the one or more random numbers to the plurality of input channels is based on a lookup table.

\* \* \* \* \*